United States Patent [19]

Ohashi

[11] Patent Number: 4,728,990

[45] Date of Patent: Mar. 1, 1988

[54] METHOD OF CONTROLLING EXPOSURE IN ELECTROPHOTOGRAPHY

[75] Inventor: Kunio Ohashi, Nara, Japan

[73] Assignee: Sharp Kabushiki Kaisha, Osaka, Japan

[21] Appl. No.: 920,040

[22] Filed: Oct. 16, 1986

[30] Foreign Application Priority Data

Oct. 30, 1985 [JP] Japan ............................... 60-245569

[51] Int. Cl.$^4$ ............................................. G03B 27/32

[52] U.S. Cl. ....................................... 355/77; 354/482; 350/311

[58] Field of Search ..................... 354/482; 355/71, 70, 355/32, 35, 37, 77; 350/164, 165, 166, 311

[56] References Cited

U.S. PATENT DOCUMENTS 3,780,631 12/1973 Schulman ........................... 354/482
4,325,608 4/1982 Kamiya .......................... 350/166 X

*Primary Examiner*—L. T. Hix
*Assistant Examiner*—Brian W. Brown
*Attorney, Agent, or Firm*—Flehr, Hohbach, Test, Albritton & Herbert

[57] ABSTRACT

Light passing through an exposure controlling device is made incident on a body which is photosensitive both within and outside a visible range. The method is so designed as to limit the spectroscopic radiation intensity both in a short and long wavelength region within the visible range and that the spectroscopic radiation intensity has one or more peaks outside the visible range.

3 Claims, 5 Drawing Figures

METHOD OF CONTROLLING EXPOSURE IN ELECTROPHOTOGRAPHY

BACKGROUND OF THE INVENTION

This invention relates to a method of controlling exposure in electrophotography and more particularly to a method of controlling the light which is made incident on a photosensitive body in a electrophotographic copying machine.

One of the functions of an exposure controlling device for a photosensitive body, for example, in an electrophotographic copying machine is to use filters and the like to adjust the spectroscopic radiation intensity of the light beam from a source according to its spectroscopic sensitiveity characteristics so as to correct the color reproduction characteristics of the copy. For example, the spectroscopic sensitivity of a Se-type photosensitive body is higher on the side of shorter wavelengths and lower on the side of longer wavelengths as shown by a solid line in FIG. 3. If a beam of light having a flat spectroscopic radiation intensity characteristics is used directly as incident light, therefor, reproduction of blue originals becomes difficult because sensitivity is too high on the short wavelength side. In a situation like this, use may be made of a filter in the exposed device or a lens in the optical system may be coated such that the light on the side of shorter wavelengths is absorbed, or its spectroscopic radiation intensity is lowered on the side of shorter wavelengths, thereby improving the color reproduction in copies.

As another example, the spectroscopic sensitivity of photosensitive bodies using OPC (organic photosensitive compounds) is high on the longer wavelength side and low on the shorter wavelength side within the visible range. In this case, reproduction of red originals becomes difficult because sensitivity is too high on the longer wavelength side as shown by a solid line in FIG. 4 and use may be made likewise of a filter or a lens coating to reduce the spectroscopic radiation intensity of the exposure light in the longer wavelength region as shown by a broken line in FIG. 4.

With some photosensitive bodies using recently developed OPCs and amorphous silicon, however, the spectroscopic sensitivity is flat not only within the visible range but also in both the shorter and longer wavelength regions outside the visible range. If a conventional exposure device were used to reduce the spectroscopic radiation intensity on both the longer and shorter wavelength sides as shown by a broken line in FIG. 5 and to correct the color reproduction in copies when such a photosensitive body is irradiated, its sensitivity outside the visible range would be wasted and the actual overall sensitivity would not be improved from the original sensitivity of the photosensitive body.

SUMMARY OF THE INVENTION

It is therefor an object of the present invention to provide a method of controlling exposure of a photosensitive body with which the actual overall sensitivity can be improved by setting the spectroscopic radiation intensity of the exposure light beam such that there are peaks also outside the visible range.

The above and other objects of the present invention are achieved by an exposure controlling device which is so designed that the spectroscopic radiation intensity of light therethrough not only is limited both in a short wavelength region and in a long wavelength region within the visible range but has a peak also outside the visible range.

BRIEF DESCRIPTION OF THE DRAWINGS

The accompanying drawings, which are incorporated in and form a part of the specification, illustrate an embodiment of the present invention and, together with the description, serve to explain the principles of the invention. In the drawings.

DETAILED DESCRIPTION OF THE INVENTION

Figure 1:
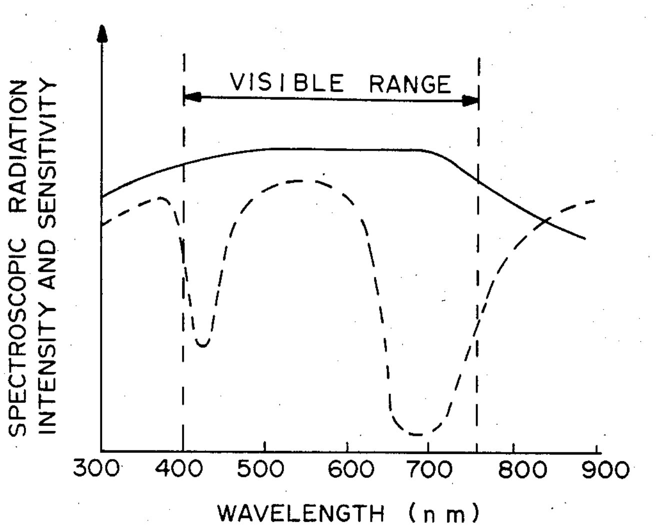
FIG. 1 shows the spectroscopic sensitivity characteristics of an exposure controlling device for a photosensitive body according to one embodiment of the present invention and the spectroscopic radiation intensity characteristics of the photosensitive body.

The method of controlling exposure for a photosensitive body described by FIG. 1 is characterized not only as being adapted to limit the spectroscopic radiation intensity of light both in a shorter wavelength region and a longer wavelength region within the visible range but also as being so set that there are peaks also outside the visible range. This setting is effected by using as the light source a halogen lamp having spectroscopic radiation intensity also outside the visible range and passing the light from this halogen lamp through a filter or coating a lens in the optical system through which this light passes so that only beams in a shorter wavelength region and a longer wavelength region within the visible range are absorbed. As a result, a light beam is obtained with spectroscopic radiation intensity characteristics having peaks in a shorter wavelength region and a longer wavelength region within the visible range as shown by a broken line in FIG. 1. As the photosensitive body, use is made of amorphous silicon with spectroscopic sensitivity characteristics as shown by the solid line of FIG. 1.

Figure 2:
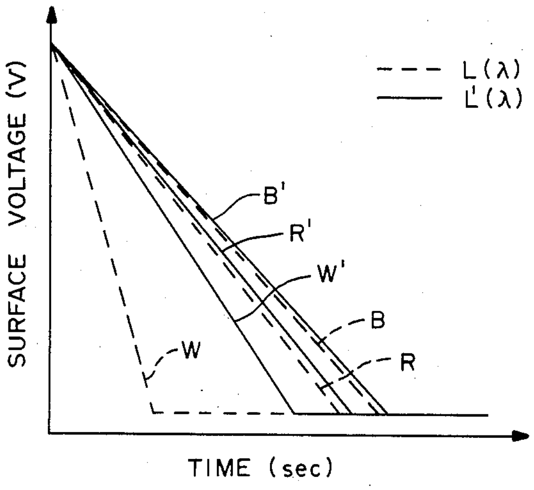
FIG. 2 shows the attenuation characteristics of light through a conventional exposure controlling device and exposure controlling device of the present invention.
Figure 3:
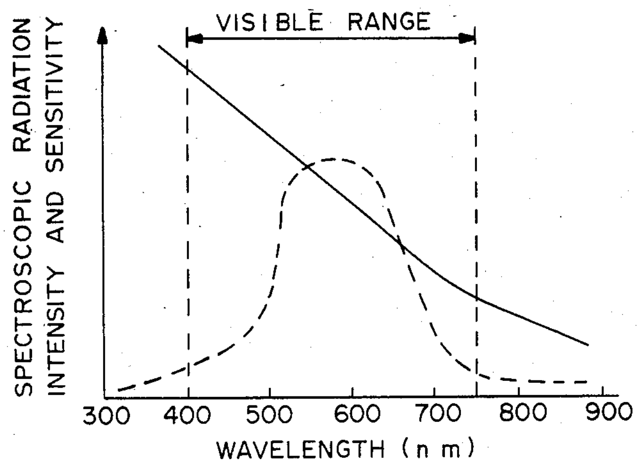
(PRIOR ART) FIG.—3
FIGS. 3 through 5 show spectroscopic radiation intensity characteristics when use is made of conventional exposure controlling devices.
Figure 4:
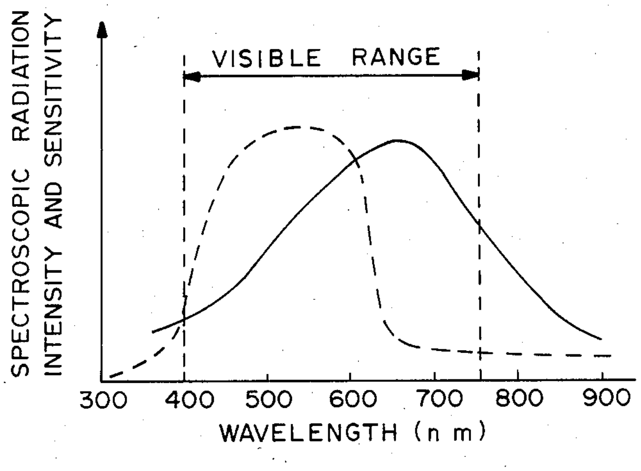
(PRIOR ART) FIG.—4
Figure 5:
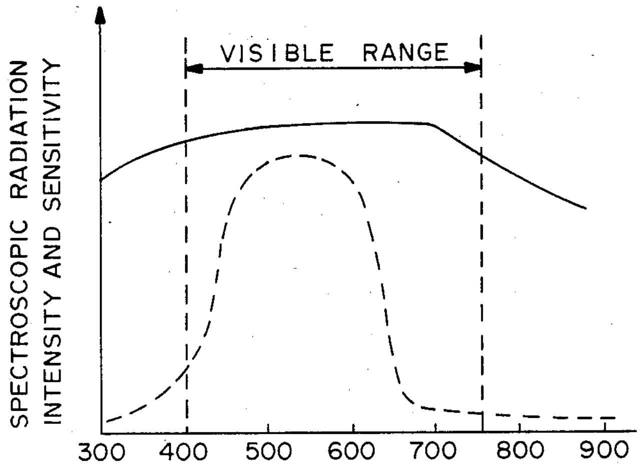
(PRIOR ART) FIG.—5

Optical attenuation characteristics of light $L(\lambda)$ obtained by using the exposure controlling method of the present invention described above and of light $L'(\lambda)$ obtained by using an exposure controlling device of the present invention described above and of light $L'(\lambda)$ with conventional spectroscopic radiation intensity characteristics shown by the broken line in FIG. 5, when they are made incident on the photosensitive body described above, are explained next by way of FIG. 2. In FIG. 2, solid lines refer to the light $L'(\lambda)$ having the aforementioned conventional characteristics, B', R' and W' respectively referring to blue, red and white light. Broken lines in FIG. 2 refer to the light L('). B, R and W respectively refer to blue, red and white light.

As can be understood clearly from FIG. 2, blue light and red light show approximately the same optical attenuation characteristics whether an exposure controlling device of the present invention is used or a conventional exposure controlling device is used (that is, B and B' are nearly alike and R and R' are nearly alike). Optical attenuation of white light is much more pronounced, however, if an exposure controlling device of the present invention is used (that is, W changes faster than W'). This is because beams of the light L(λ) outside the visible range are contributing effectively.

In summary, color reproduction characteristics in copies are not adversely affected by an exposure controlling device of the present invention because optical attenuation of red and blue light is suppressed as by the conventional exposure controlling devices, but since white light is attenuated much faster, the overall sensitivity can be improved to a remarkable degree by as exposure controlling device of the present invention.

The foregoing description of a preferred embodiment of the invention has been presented for purposes of illustration and description. It is not intended to be exhaustive or to limit the invention to the precise form disclosed, and obviously many modifications and variations are possible in light of the above teaching. For example, although the broken curve in FIG. 1 shows two peaks outside the visible range, one on the shorter wavelength side and the other on the longer wavelength side, spectroscopic radiation intensity characteristics with only one of the peaks (either on the shorter of longer wavelength side of the visible range) can also be utilized effectively. Such modifications and variations which may be apparent to a person skilled in the art are intended to be included within the scope of this invention.

What is claimed is:

1. A method of controlling incident light on a body which is photosensitive not only within a visible range of light but also outside said visible range, said method comprising the steps of limiting the spectroscopic radiation intensity of said incident light both in a short wavelength region and in a long wavelength region within said visible range, and providing one or more peaks in the spectroscopic radiation intensity of said incident light with one or more peaks outside said visible range.

2. The method of claim 1 wherein said incident light is from a halogen lamp.

3. The method of claim 1 wherein said short wavelength region is a red region and said long wavelength region is a blue region.

* * * * *

UNITED STATES PATENT AND TRADEMARK OFFICE
CERTIFICATE OF CORRECTION

PATENT NO. : 4,728,990
DATED : March 1, 1988
INVENTOR(S) : Kunio Ohashi

It is certified that error appears in the above—identified patent and that said Letters Patent is hereby corrected as shown below:

Column 1, about line 23, change "therefor" to --therefore--.

Column 1, about line 58, change "therefor" to --therefore--.

Signed and Sealed this

Second Day of August, 1988

*Attest:*

DONALD J. QUIGG

*Attesting Officer* *Commissioner of Patents and Trademarks*